(12) United States Patent
Yamamoto et al.

(10) Patent No.: US 10,976,280 B2
(45) Date of Patent: Apr. 13, 2021

(54) ELECTROCHEMICAL GAS SENSOR

(71) Applicant: Figaro Engineering Inc., Minoo (JP)

(72) Inventors: Yoshihiro Yamamoto, Minoo (JP); Kuniyuki Izawa, Minoo (JP)

(73) Assignee: Figaro Engineering Inc., Minoo (JP)

( * ) Notice: Subject to any disclaimer, the term of this patent is extended or adjusted under 35 U.S.C. 154(b) by 196 days.

(21) Appl. No.: 16/308,523

(22) PCT Filed: May 11, 2017

(86) PCT No.: PCT/JP2017/017821
§ 371 (c)(1),
(2) Date: Feb. 13, 2019

(87) PCT Pub. No.: WO2018/003308
PCT Pub. Date: Jan. 4, 2018

(65) Prior Publication Data
US 2019/0339226 A1 Nov. 7, 2019

(30) Foreign Application Priority Data

Jul. 1, 2016 (JP) .............................. JP2016-131346

(51) Int. Cl.
*G01N 27/404* (2006.01)
*G01N 27/407* (2006.01)
(Continued)

(52) U.S. Cl.
CPC ....... *G01N 27/4072* (2013.01); *G01N 27/404* (2013.01); *G01N 27/417* (2013.01); *G01N 27/4162* (2013.01)

(58) Field of Classification Search
None
See application file for complete search history.

(56) References Cited

U.S. PATENT DOCUMENTS

| 5,650,054 A | 7/1997 | Shen et al. |
| 8,535,498 B2 | 9/2013 | Inoue et al. |

(Continued)

FOREIGN PATENT DOCUMENTS

| JP | 2004170100 A | 6/2004 |
| JP | 2005503541 A | 2/2005 |

(Continued)

OTHER PUBLICATIONS

International Search Report PCT/JP2017/017821, dated Aug. 8, 2017.

*Primary Examiner* — J. Christopher Ball
(74) *Attorney, Agent, or Firm* — The Webb Law Firm

(57) ABSTRACT

An electrochemical gas sensor has a planar ceramic housing having a recess, a MEA, first and second electrically conductive gas diffusion membranes, and a metal lid fixed on the housing so as to cover the recess. The MEA is provided with an ionic conductive membrane, a first electrode on a surface of the membrane, and a second electrode on the opposite surface of the membrane. The first electrically conductive gas diffusion membrane is electrically connected to the first electrical connection. The second electrically conductive gas diffusion membrane is electrically connected to the second electrical connection. The lid presses the second electrically conductive gas diffusion membrane toward the MEA, and in the lid or in the bottom of the housing, a gas inlet is provided. The electrochemical gas sensor is easily made compact, small in the variations in the performances, and easily installed on a print circuit board.

5 Claims, 3 Drawing Sheets

(51) Int. Cl.
  *G01N 27/416*  (2006.01)
  *G01N 27/417*  (2006.01)

(56) References Cited

U.S. PATENT DOCUMENTS

2004/0134780 A1* 7/2004 Inoue ................. G01N 27/4074
                                              204/424
2015/0027887 A1* 1/2015 Lee .................... G01N 27/3335
                                              204/406

FOREIGN PATENT DOCUMENTS

| JP | 2005221411 A | 8/2005 |
| JP | 2008164305 A | 7/2008 |
| JP | 201481348 A | 5/2014 |
| JP | 5693496 B2 | 2/2015 |
| WO | 0114864 A3 | 3/2001 |

* cited by examiner

# ELECTROCHEMICAL GAS SENSOR

CROSS-REFERENCE TO RELATED APPLICATIONS

This application is the United States national phase of International Application No. PCT/JP2017/017821 filed May 11, 2017, and claims priority to Japanese Patent Application No. 2016-131346 filed Jul. 1, 2016, the disclosures of which are hereby incorporated in their entirety by reference.

FIELD OF THE INVENTION

The present invention relates to a housing structure for electrochemical gas sensors.

BACKGROUND ART

Gases such as CO are detected by electrochemical gas sensors (Patent Document 1: JP5693,496B, Patent Document 2: WO01/014864A). A MEA, the main component of the gas sensor, comprises a proton conductor membrane, a retaining sheet for an electrolyte solution or an ionic liquid, or the like, and a detection and a counter electrode on both surfaces of the membrane or the sheet. When in contact with gases, an electric current or an electromotive force is generated between the electrodes and it is the output of the gas sensor. On both sides of the MEA, a pair of permeable conductive membranes (electrically conductive gas diffusion membranes) are stacked, atmosphere to be detected is supplied through one of the conductive membranes adjacent to the detection electrode, oxygen is supplied through the other conductive membrane adjacent to the counter electrode, and the produced water vapor is exhausted from the counter electrode (Patent Document 1).

Regarding the housing structure of electrochemical gas sensors, Patent Document 1 proposes a structure similar to button-like cells; between two metal plates insulated by a gasket, the conductive membranes and the MEA are positioned, and they are fixed by caulking. The pressure according to the caulking affords the electrical contact from the MEA to the two metal plates.

According to Patent Document 2, a pair of housings each having a recess are stacked so that the recesses face each other, and the MEA is accommodated in the recesses. According to Patent Document 2, a liquid electrolyte is reserved within the recesses, and the electrodes are exposed through holes in the housing or the like so as to connect them to the outward part.

LIST OF PRIOR ART DOCUMENTS

Patent Documents

Patent Document 1: JP5693,496B
Patent Document 2: WO01/014864A

SUMMARY OF THE INVENTION

Problems to be Solved by the Invention

The housing according to Patent Document 1 uses a gasket and caulking, and therefore, it is difficult to make the gas sensors smaller than presently they are. Further, since the caulking may be a cause of variations of the MEA positions, the production control is difficult.

Regarding the housing according to Patent Document 2, the connection between the electrodes and a periphery circuit is difficult. Further, when the permeable electrically conductive membranes are used, it is difficult to press the membranes with a predetermined pressure so as to secure the contact between the electrodes and the membranes.

The object of the invention is to provide an electrochemical gas sensor that may be easily made compact, has uniform performances, and may be easily installed on a substrate.

Means for Solving the Problems

An electrochemical gas sensor according to the invention comprises:
a planar ceramic housing having a recess;
a MEA provided with an ionic conductive membrane, a first electrode on a surface of the ionic conductive membrane, a second electrode on an opposite surface of the ionic conductive membrane;
a first electrically conductive gas diffusion membrane and a second electrically conductive gas diffusion membrane; and
a metal lid fixed on said housing and covering said recess,
said housing is provided with a first electrical connection extending from a bottom surface of said recess to a bottom surface of the housing and a second electrical connection extending from a top surface of the housing surrounding said recess to the bottom surface of the housing;
the first electrically conductive gas diffusion membrane is positioned between said MEA and the bottom surface of said recess and is electrically connected to said first electrical connection;
the second electrically conductive gas diffusion membrane is positioned between said MEA and the lid and is electrically connected to the lid;
said lid is fixed on said top surface and is electrically connected to said second electrical connection;
said second electrically conductive gas diffusion membrane is pressed toward said MEA by said lid; and
a gas inlet is provided in said lid or in the bottom surface of said housing.

According to the invention, since no caulking or a gasket is needed, the electrochemical gas sensor is made compact. The lid presses the first and second electrically conductive membranes and the MEA toward the bottom surface of the recess, and therefore, an electrical path from the MEA through the second electrically conductive membrane to the lid and an electrical path from the MEA through the first electrically conductive membrane to the first electrical connection are gotten. Further, the lid is electrically connected by the second electrical connection to the bottom surface of the housing, and the first electrical connection also extends to the bottom surface. Therefore, the two electrodes of the gas sensor may be connected to a periphery circuit on the bottom surface of the housing. In this specification, the direction is indicated as the lid is at the upper side and the bottom surface of the recess is at the lower side.

Preferably, a metal layer is provided on said top surface and said lid is welded to said metal layer. Since the lid is welded to the metal layer, the lid may be easily fixed on the housing and the lid may be electrically connected to the metal layer reliably and air-tightly.

Preferably, said lid is provided with a hole serving as said gas inlet, and the bottom surface of said housing is air-tight. Since the lid is made of a metal, the small size gas inlet hole may accurately be provided so that the permeability to the inside of the gas sensor is kept constant. Further, since the lid has the gas inlet hole, the bottom surface of the housing is made air-tight.

Preferably, an electrically conductive and sheet-like gas adsorption filter is provided between said second electrically conductive gas diffusion membrane and said lid. There are electrically conductive active carbons, and most of gas adsorbents such as silica gel, zeolite, mesoporous silica may be made electrically conductive by the addition of electrically conductive particles such as carbon black, for example. Therefore, an electrically conductive path may be secured from the second electrically conductive gas diffusion membrane through the gas adsorption filter to the lid. Further, it is enough for the gas adsorption filter to deal with a small amount of gas that has diffused through the gas inlet hole, and therefore, the service life of the filter is enhanced.

Preferably, said MEA, the first electrically conductive gas diffusion membrane, the second electrically conductive gas diffusion membrane, said recess, said housing, and said lid are all four-sided figures in plan view, for example, a rectangle or a square. Instead of a circular MEA in Patent Document 1, a quadrilateral MEA is used, and therefore, the cut loss of the MEA may be reduced when the MEA is punched out from an initial sheet. Since the MEA is made quadrilateral, the housing, the lid, the recess, and the first and second electrically conductive gas diffusion membranes are all quadrilateral.

Preferably, said recess is provided with the bottom surface, a first wall surrounding the bottom surface, a flat surface surrounding an upper edge of the first wall, and a second wall surrounding the flat surface, and said top surface is provided over the second wall and surrounds the second wall;

said first electrically conductive gas diffusion membrane is in contact with the bottom surface of the recess and is surrounded by the first wall;

said second electrically conductive gas diffusion membrane is surrounded by the second wall; and edges of said MEA or edges of said second electrically conductive gas diffusion membrane are positioned on said flat surface.

The electrically conductive membranes are compressed by the pressure from the lid, and this pressure secures the contact between the first electrically conductive membrane and the MEA, the contact between the second electrically conductive membrane and the MEA, and the contact between the latter membrane and the first electrical connection. The flat surface, between the bottom surface and the top surface of the recess, separates the recess to one part from the top surface till the flat surface and to the other part from the flat surface till the bottom surface, along the depth direction. Therefore, the compressed thickness of the first electrically conductive membrane and the compressed thickness of the second electrically conductive membrane may be regulated. Since edges of the MEA or edges of the second electrically conductive gas diffusion membrane are positioned on the flat surface, the two electrically conductive gas diffusion membranes do not contact each other, and the atmosphere is insulated between the upper side of the flat surface and the lower side.

EXAMPLES FOR CARRYING OUT THE INVENTION

Figure 1:
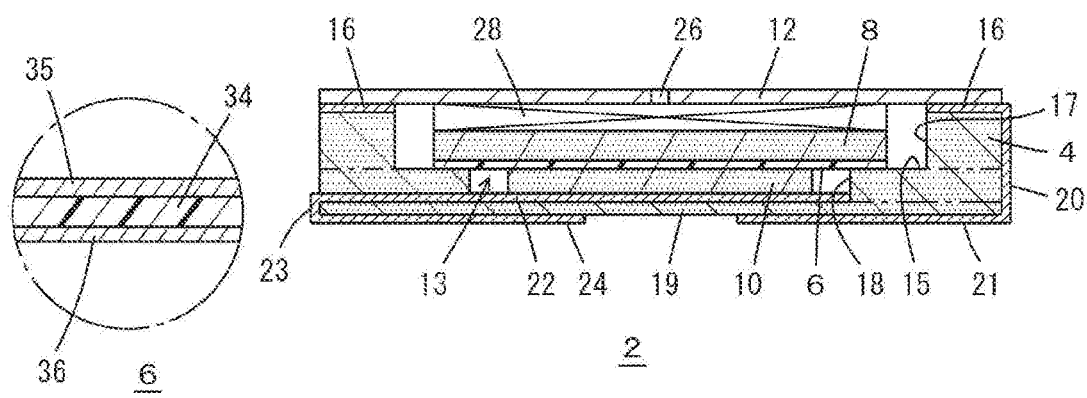
FIG. 1 A sectional view of an electrochemical gas sensor according to an embodiment FIG. 2 A plan view of the electrochemical gas sensor according to the embodiment FIG. 3 An exploded plan view of the electrochemical gas sensor without a lid according to the embodiment FIG. 4 A sectional view of a housing for the electrochemical gas sensor according to the embodiment FIG. 5 An enlarged sectional partial view of the electrochemical gas sensor according to the embodiment FIG. 6 A sectional view of an electrochemical gas sensor according to a modified embodiment FIG. 7 A sectional view of an electrochemical gas sensor according to a second modified embodiment
Figure 2:
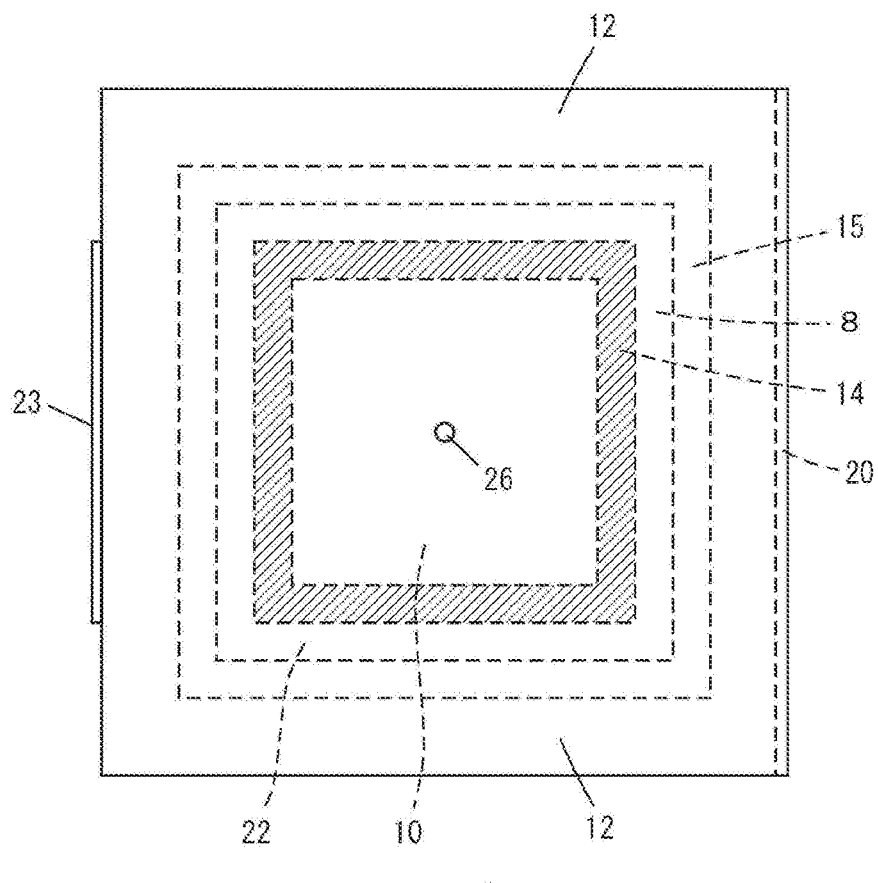
Figure 3:
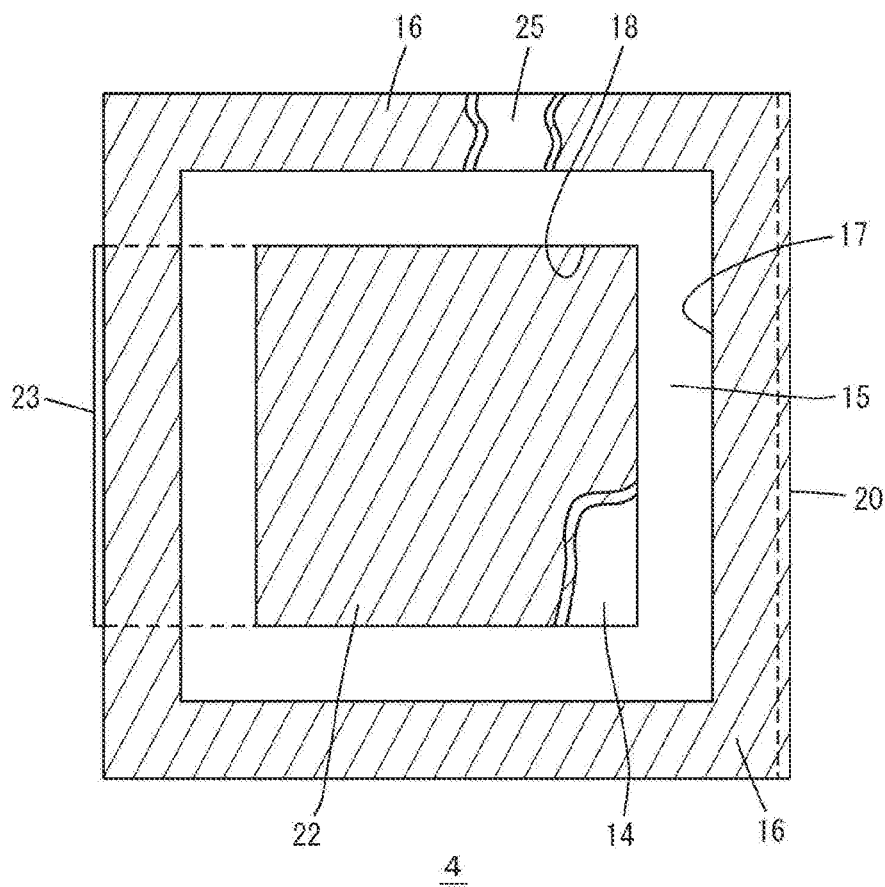
Figure 4:
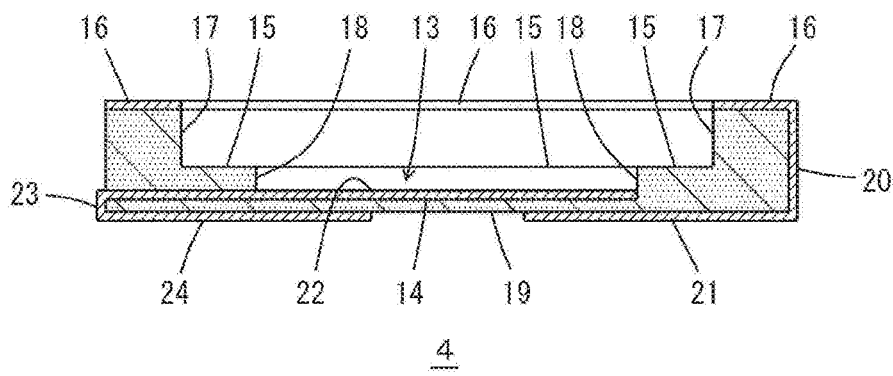

In the following, the best embodiment for carrying out the invention will be described.

Embodiments

FIGS. 1-5 show an embodiment. An electrochemical gas sensor 2 is provided with a ceramic housing 4, a MEA 6, electrically conductive gas diffusion membranes 8, 10 which are positioned over and under the MEA 6, and a metal lid 12. These parts 4-12 are rectangular or square in plan view and the MEA 6 and the conductive gas diffusion membranes 8, 10 are accommodated within a recess 13 of the housing 4.

The housing 4 is provided with the recess 13 which is rectangular or square in plan view. Indicated by 14 is the bottom surface of the recess 13, indicated by 15 is an intermediate flat surface that surrounds the bottom surface 14, and indicated by 25 is a top surface that surrounds the flat surface 15. Between the top surface 25 and the flat surface 15 is a wall surface 17 which is, for example, vertical, and between the flat surface 15 and the bottom surface 14 is another wall surface 18 which is for example vertical. The top surface 25 is covered by a metal layer 16, for example entirely; the metal layer 16 may be fabricated by baking both a metal material for the layer and a ceramic material for the housing 4 simultaneously or by brazing a metal plate on the top surface 25. The metal layer 16 is electrically connected to an electrical connection 21 on the bottom surface 19 of the housing 4 through another electrical connection 20.

An electrical connection 22 is provided entirely or partially on the bottom surface 14 of the recess and it is extended on the bottom surface 19 of the housing 4 through electrical connections 23, 24. The electrical connections 20-24 are made by baking a metal material for the connections with the ceramic material for the housing 4 simultaneously. While the electrical connection 20, 23 extend along the side surfaces of the housing 4, electrically conductive air-tight through holes may be provided in the housing 4 instead of them.

The lid 12 has one or plural gas inlet holes 26 and the size of the gas inlet hole 26 is made constant so that the permeability to the inside of the gas sensor 2 is made constant. Since the inlet holes are made by a hole production process to the metal plate, the desired constant size gas inlet holes 26 are produced. Instead of the gas inlet hole in the lid 12, the layer from the bottom surface 19 to the bottom surface 14 of the recess 13 of the housing 4 may be made a permeable ceramic layer.

As shown in the left side of FIG. 1, the MEA 6 comprises a proton conductive membrane 34, a detection electrode 35 laminated on the upper surface of the membrane, and a counter electrode 36 laminated on the lower surface. In place of the proton conductive membrane 34, a sheet retaining an electrolyte solution or an ionic liquid may be usable. The MEA 6 is the most expensive part of the gas sensor 2 and the MEA 6 is cut out from a mother sheet of the MEA by a punch. The rectangular or square MEA 6 produces no cut loss.

The electrically conductive gas diffusion membranes 8, 10 are permeable sheets including carbon black, carbon fiber, or another electrically conductive particles, and a high electrical conductivity is not necessary for them. While the diffusion membranes 8, 10 may be made hydrophobic by adding fibers such as PTFE preferably, they include hydrophilic fibers such as poly-amid, methyl-cellulose, polyvinyl-alcohol fibers, in order to adjust the humidity within the housing and to reduce the humidity dependency of the gas sensor 2.

Indicated by 28 is a filter made of a sheet comprising active carbon with permeability and electrical conductivity; it is positioned between the lid 12 and the first electrically conductive membrane 8 and electrically connects them. The filter 28 may be a sheet comprising a mixture of electrically conductive particles and another adsorbent such as zeolite, silica gel, mesoporous silica, and is shaped with a fiber-like binder.

Figure 5:
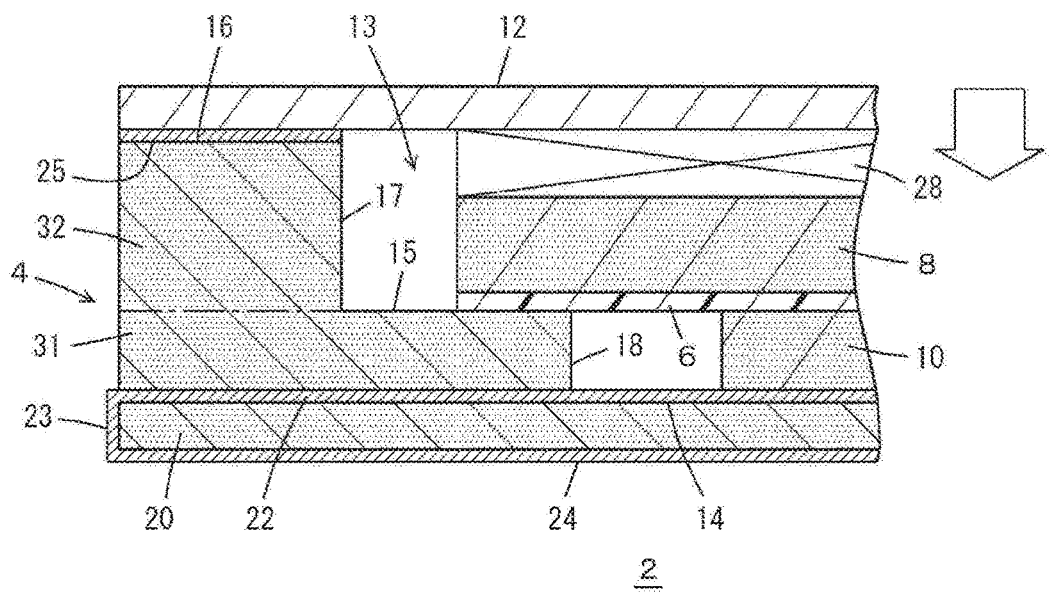

The production process of the gas sensor 2 will be described. As shown in FIG. 5, the housing 4 comprises the three layers 30-32. For example, the electrical connections 21, 22, and 24 are provided on both sides of the layer 30, the metal layer 16 is provided on the top surface 25 of the layer 32, and the layers 30-32 are stacked and baked to form the housing. The electrical connections 20, 23 may be formed and baked simultaneously with the layers 30-32, or they may be formed after the baking of the layers 30-32.

The electrically conductive gas diffusion membranes 8, 10 are stacked both under and over the MEA 6, and, for example, the electrically conductive gas diffusion membrane 10 is positioned on the bottom surface 14 of the recess 13. At least one of the MEA 6 and the electrically conductive membrane 8 is supported by the flat surface 15, therefore, the contact between the electrically conductive membranes 8, 10 are prevented, and the atmosphere is separated to the upper space and the lower space of the flat surface 15.

The filter 28 is stacked over the gas diffusion membrane 28, and the lid 12 covers the recess 13. The lid 12 is welded to the metal layer 16 by seam welding. Since the seam welding has been used for the encapsulation of IC chips into their ceramic packages, the lid 12 is fixed on the housing 4 easily and air-tightly. However, instead of the seam welding, adhesion with an electrically conductive adhesive or the like is possible.

The lid 12 presses the filter 28, the electrically conductive gas diffusion membrane 8, the MEA 6, and the electrically conductive gas diffusion membrane 10 toward the bottom surface 14 of the recess 13, and therefore, these parts are electrically connected with each other and are fixed in the recess. The electrically conductive gas diffusion membranes 8, 10 are made thinner by the pressure from the lid; the thickness of the electrically conductive gas diffusion membrane 10 under the pressure is determined according to the height of the wall surface 18, and the thickness of the gas diffusion membrane 8 under the pressure is determined according to the height of the wall surface 17. Further, the edges of both the MEA 6 and the conductive gas diffusion membrane 8 are supported by the flat surface 15 and therefore, the conductive gas diffusion membranes 8, 10 do not mutually contact. More, the gap between the wall surface 18 and the conductive gas diffusion membrane 10 are covered by the MEA 6 and the conductive gas diffusion membrane 8, and therefore, the atmosphere around the detection electrode is restricted from going around toward the counter electrode.

Since the detection and counter electrodes of the MEA 6 are electrically connected to the electrical connections 21, 24 on the bottom surface of the housing 4, the gas sensor 2 may be installed on a substrate such as a print circuit board by reflow soldering, an electrically conductive adhesive, or the like.

Figure 6:
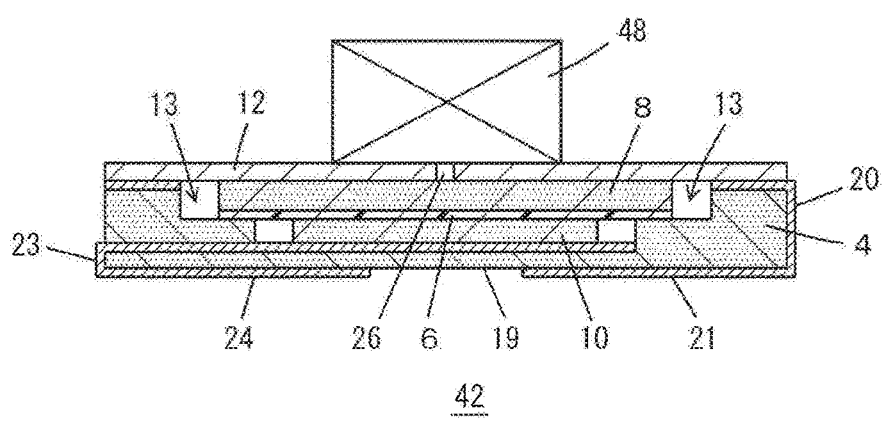

FIG. 6 indicates an electrochemical gas sensor 42 according to a first modified example that is similar to the embodiment in FIGS. 1-5, unless otherwise specified. In the gas sensor 42, a filter 48 comprising a gas adsorbent is positioned over the gas inlet hole 26 of the lid 12. The larger filter 48 than the filter 28 is necessary, since gas is treated before the gas flow quantity is restricted by the gas inlet hole 26.

Figure 7:
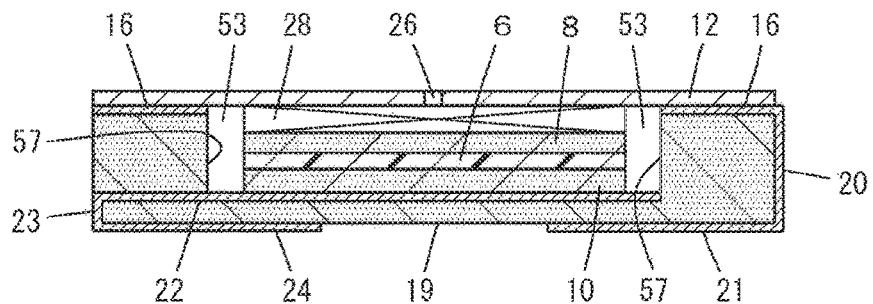

FIG. 7 indicates an electrochemical gas sensor 52 according to a second modified example that is similar to the embodiment in FIGS. 1-5, unless otherwise specified. Instead of the two staged recess 13 that has the intermediate flat surface 15, a rectangular or square single staged recess 53 is provided, and the recess accommodates the MEA 6, the gas diffusion membranes 8, 10, and the filter 28. Indicated by 57 is a wall surface of the recess 53.

| Description of Symbols | | | |
|---|---|---|---|
| 2 | electrochemical gas sensor | 4 | housing |
| 6 | MEA | | |
| 8, 10 | electrically conductive gas diffusion membrane | | |
| 12 | lid | 13 | recess |
| 14 | bottom surface of the recess | 15 | flat surface |
| 16 | metal layer | 17, 18 | wall surface |
| 19 | bottom surface of the housing | 20-24 | electrical connection |
| 25 | top surface | 26 | gas inlet hole |
| 28, 48 | filter | 30-32 | layer |
| 34 | proton conductive membrane | 35 | detection electrode |
| 36 | counter electrode | 42, 52 | electrochemical gas sensor |
| 53 | recess | 57 | wall surface |

The invention claimed is:

1. An electrochemical gas sensor comprising:
a planar ceramic housing having a recess;
a MEA provided with an ionic conductive membrane, a first electrode on a surface of the ionic conductive membrane, a second electrode on an opposite surface of the ionic conductive membrane:
a first electrically conductive gas diffusion membrane and a second electrically conductive gas diffusion membrane; and
a metal lid fixed on said housing and covering said recess,
wherein said housing is provided with a first electrical connection extending from a bottom surface of said recess to a bottom surface of the housing and a second electrical connection extending from a top surface of the housing surrounding said recess to the bottom surface of the housing;
wherein the first electrically conductive gas diffusion membrane is positioned between said MEA and the bottom surface of said recess and is electrically connected to said first electrical connection;
wherein the second electrically conductive gas diffusion membrane is positioned between said MEA and the lid and is electrically connected to the lid;

wherein said lid is fixed on said top surface and is electrically connected to said second electrical connection;

wherein said second electrically conductive gas diffusion membrane is pressed toward said MEA by said lid;

wherein a gas inlet is provided in said lid or in the bottom surface of said housing; and wherein a metal layer is provided on said top surface and said lid is welded to said metal layer.

2. The electrochemical gas sensor according to claim 1, wherein said lid is provided with a hole serving as said gas inlet, and wherein the bottom surface of said housing is air-tight.

3. The electrochemical gas sensor according to claim 1, wherein said MEA, the first electrically conductive gas diffusion membrane, the second electrically conductive gas diffusion membrane, said recess, said housing, and said lid are all four-sided figures in plane view.

4. An electrochemical gas sensor comprising:
a planar ceramic housing having a recess;
a MEA provided with an ionic conductive membrane, a first electrode on a surface of the ionic membrane, a second electrode on an opposite surface of the ionic conductive membrane;
a first electrically conductive gas diffusion membrane and a second electrically conductive gas diffusion membrane; and
a metal lid fixed on said housing and covering said recess,
wherein said housing id provided with a first electrical connection extending from a bottom surface of said recess to a bottom surface of the housing and a second electrical connection extending from a top surface of the housing surrounding said recess to the bottom surface of the housing;
wherein the first electrically conductive gas diffusion membrane is positioned between said MEA and the bottom surface of said recess and is electrically connected to said first electrical connection;
wherein the second electrically conductive gas diffusion membrane is positioned between said MEA and the lid and is electrically connected to the lid;
wherein said lid is fixed on said top surface and is electrically connected to said second electrical connection;
wherein said second electrically conductive gas diffusion membrane is pressed toward said MEA by said lid;
wherein a gas inlet is provided in said lid or in the bottom surface of said housing; and wherein an electrically conductive and sheet-like gas adsorption filter is provided between said second electrically conductive gas diffusion membrane and said lid.

5. An electrochemical gas sensor comprising:
a planar ceramic housing having a recess;
a MEA provided with an ionic conductive membrane, a first electrode on a surface of the ionic membrane, a second electrode on an opposite surface of the ionic conductive membrane;
a first electrically conductive gas diffusion membrane and a second electrically conductive gas diffusion membrane; and
a metal lid fixed on said housing and covering said recess,
wherein said housing id provided with a first electrical connection extending from a bottom surface of said recess to a bottom surface of the housing and a second electrical connection extending from a top surface of the housing surrounding said recess to the bottom surface of the housing;
wherein the first electrically conductive gas diffusion membrane is positioned between said MEA and the bottom surface of said recess and is electrically connected to said first electrical connection;
wherein the second electrically conductive gas diffusion membrane is positioned between said MEA and the lid and is electrically connected to the lid;
wherein said lid is fixed on said top surface and is electrically connected to said second electrical connection;
wherein said second electrically conductive gas diffusion membrane is pressed toward said MEA by said lid;
wherein a gas inlet is provided in said lid or in the bottom surface of said housing;
wherein said recess is provided with the bottom surface, a first wall surrounding the bottom surface, a flat surface surrounding an upper edge of the first wall, and a second wall surrounding the flat surface, and wherein said top surface is provided over the second wall and surrounds the second wall;
wherein said first electrically conductive gas diffusion membrane is in contact with the bottom surface of the recess and is surrounded by the first wall;
wherein said second electrically conductive gas diffusion membrane is surrounded by the second wall; and
wherein edges of said MEA or edges of said second electrically conductive gas diffusion membrane are positioned on said flat surface.

* * * * *

UNITED STATES PATENT AND TRADEMARK OFFICE
CERTIFICATE OF CORRECTION

PATENT NO. : 10,976,280 B2
APPLICATION NO. : 16/308523
DATED : April 13, 2021
INVENTOR(S) : Yoshihiro Yamamoto et al.

Page 1 of 1

It is certified that error appears in the above-identified patent and that said Letters Patent is hereby corrected as shown below:

In the Claims

Column 7, Line 19, Claim 3, delete "plane" and insert -- plan --

Column 7, Line 23, Claim 4, after "ionic" insert -- conductive --

Column 7, Line 25, Claim 4, delete "membrane;" and insert -- membrane: --

Column 7, Line 29, Claim 4, delete "id" and insert -- is --

Column 8, Line 8, Claim 5, after "ionic" insert -- conductive --

Column 8, Line 10, Claim 5, delete "membrane;" and insert -- membrane: --

Column 8, Line 14, Claim 5, delete "id" and insert -- is --

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*